(12) United States Patent
Fredriksen (10) Patent No.: US 10,732,758 B2
(45) Date of Patent: Aug. 4, 2020

(54) TOUCHSCREEN COMMUNICATION INTERFACE

(71) Applicant: Neodrón Limited, Dublin (IE)

(72) Inventor: Einar Fredriksen, Trondheim (NO)

(73) Assignee: Neodrón Limited, Dublin (IE)

( * ) Notice: Subject to any disclaimer, the term of this patent is extended or adjusted under 35 U.S.C. 154(b) by 0 days.

(21) Appl. No.: 14/930,480

(22) Filed: Nov. 2, 2015

(65) Prior Publication Data

US 2017/0123553 A1    May 4, 2017

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0412* (2013.01)

(58) Field of Classification Search
CPC ............................... G06F 3/0416; G06F 3/044
See application file for complete search history.

(56) References Cited

U.S. PATENT DOCUMENTS

| | | | |
|---|---|---|---|
| 7,218,314 B2 * | 5/2007 | Itoh | G06F 3/0418 178/19.07 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,232,972 B2 * | 7/2012 | Huang | G06F 3/044 345/173 |
| 8,643,609 B2 * | 2/2014 | Yu | G06F 3/044 178/18.06 |
| 8,723,824 B2 | 5/2014 | Myers | |
| 8,923,014 B2 * | 12/2014 | Kim | G06F 3/0418 345/173 |
| 9,348,470 B2 * | 5/2016 | Brown | G06F 3/044 |
| 9,423,830 B1 * | 8/2016 | Wei | B29D 11/00663 |
| 9,436,326 B2 * | 9/2016 | Jo | G06F 3/0418 |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Nitin Patel
*Assistant Examiner* — Robert M Stone
(74) *Attorney, Agent, or Firm* — Shami Messinger PLLC (57) ABSTRACT

An apparatus includes a display stack, a touch sensor, and a touch sensor controller. The display stack includes one or more layers. The touch sensor is disposed, at least in part, on a layer from among the one or more layers. The touch sensor controller has first and second portions. The first portion is coupled to a driver and is disposed, at least in part, on a layer from among the one or more layers. The second portion is coupled to a current sensor. The current sensor and the driver are coupled to a capacitor.

20 Claims, 7 Drawing Sheets

(56) References Cited

U.S. PATENT DOCUMENTS

| | | | |
|---|---|---|---|
| 9,477,263 B2* | 10/2016 | Hotelling | G06F 1/1626 |
| 9,500,895 B2* | 11/2016 | Mo | G02F 1/133512 |
| 2004/0119484 A1* | 6/2004 | Basir | B60Q 5/003 |
| | | | 324/680 |
| 2005/0206626 A1* | 9/2005 | Mattice | G06F 3/044 |
| | | | 345/173 |
| 2007/0084644 A1* | 4/2007 | Chung | G01D 5/00 |
| | | | 178/18.06 |
| 2007/0171209 A1* | 7/2007 | Lin | G06F 3/046 |
| | | | 345/173 |
| 2007/0268272 A1* | 11/2007 | Perski | G06F 3/044 |
| | | | 345/173 |
| 2008/0309635 A1 | 12/2008 | Matsuo | |
| 2009/0250268 A1* | 10/2009 | Staton | G06F 3/0412 |
| | | | 178/18.06 |
| 2009/0315854 A1 | 12/2009 | Matsuo | |
| 2010/0026639 A1* | 2/2010 | Lee | G06F 3/0412 |
| | | | 345/173 |
| 2011/0037457 A1* | 2/2011 | Chuang | G06F 3/0416 |
| | | | 324/120 |
| 2011/0037708 A1* | 2/2011 | Yang | G06F 3/044 |
| | | | 345/173 |
| 2011/0063233 A1* | 3/2011 | Chuang | G06F 3/0416 |
| | | | 345/173 |
| 2011/0122089 A1* | 5/2011 | Kobayashi | G06F 3/044 |
| | | | 345/174 |
| 2011/0163992 A1* | 7/2011 | Cordeiro | G06F 3/0416 |
| | | | 345/174 |
| 2011/0248940 A1* | 10/2011 | Chuang | G06F 3/045 |
| | | | 345/173 |
| 2011/0304582 A1* | 12/2011 | Ho | G06F 3/044 |
| | | | 345/174 |
| 2012/0056663 A1* | 3/2012 | Oh | G06F 3/0412 |
| | | | 327/517 |
| 2012/0229421 A1* | 9/2012 | Kim | G06F 3/0412 |
| | | | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0319966 A1* | 12/2012 | Reynolds | G06F 3/041 |
| | | | 345/173 |
| 2013/0076612 A1 | 3/2013 | Myers | |
| 2014/0001023 A1* | 1/2014 | Guard | G06F 3/044 |
| | | | 200/600 |
| 2014/0176495 A1* | 6/2014 | Vlasov | G06F 3/044 |
| | | | 345/174 |
| 2015/0179122 A1* | 6/2015 | Brown | G06F 3/0416 |
| | | | 345/174 |
| 2016/0306456 A1* | 10/2016 | Slamkul | G06F 3/0418 |
| 2017/0123551 A1* | 5/2017 | Li | G06F 3/0416 |

* cited by examiner

TOUCHSCREEN COMMUNICATION INTERFACE

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
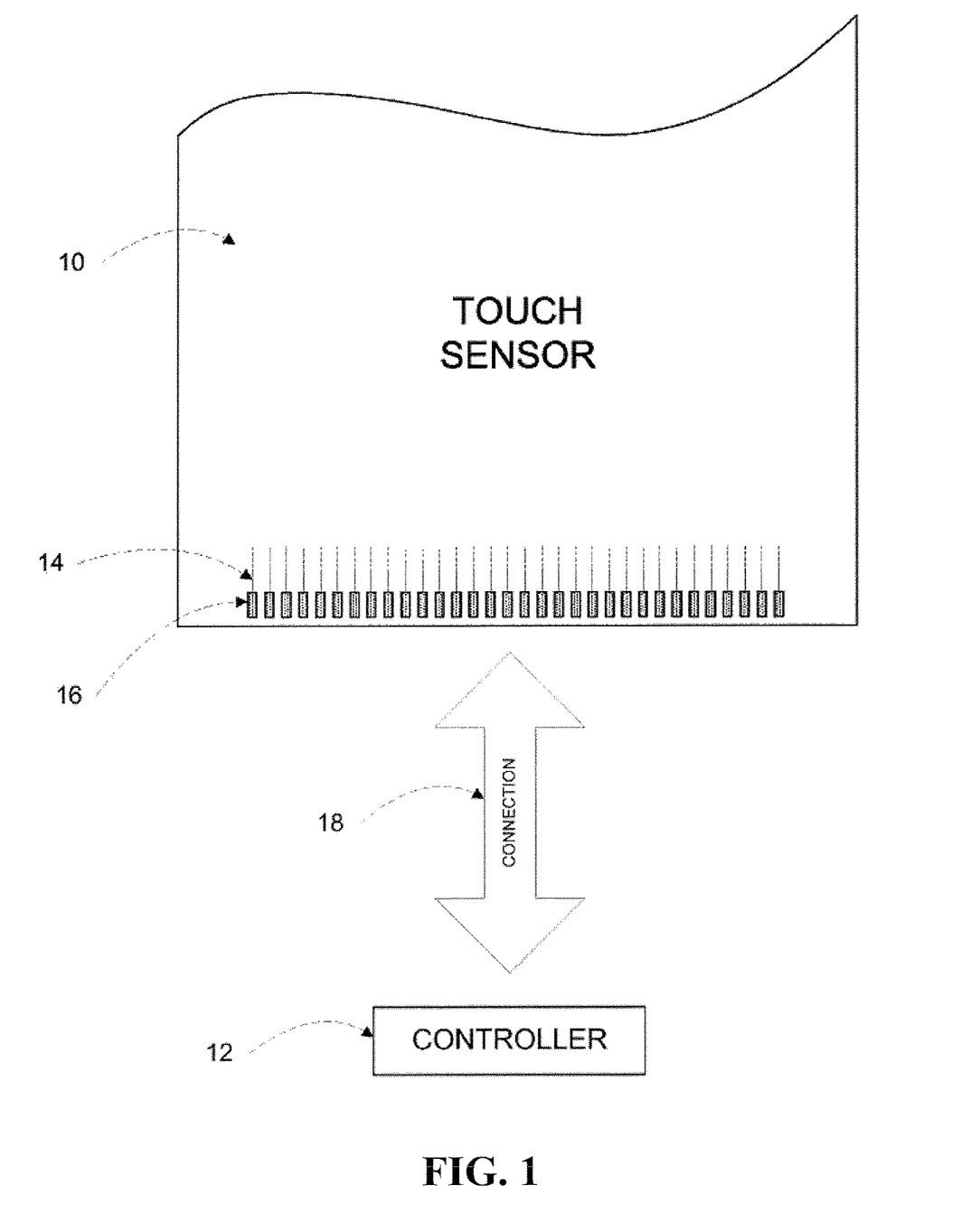
FIG. 1 illustrates an example touch sensor with an example controller in accordance with an embodiment.

FIG. 1 illustrates an example touch sensor 10 with an example controller 12. Touch sensor 10 and touch-sensor controller 12 detects the presence and location of a touch or the proximity of an object within a touch-sensitive area of touch sensor 10. Herein, reference to a touch sensor encompasses both the touch sensor and its touch-sensor controller, where appropriate. Similarly, reference to a touch-sensor controller encompasses both the touch-sensor controller and its touch sensor, where appropriate. Touch sensor 10 includes one or more touch-sensitive areas, where appropriate. Touch sensor 10 includes an array of drive and sense electrodes (or an array of electrodes of a single type) disposed on one or more substrates, which are made of a dielectric material. In particular embodiments, the touch-sensitive areas of touch sensor 10 are defined by the array of drive and sense electrodes. Herein, reference to a touch sensor encompasses both the electrodes of the touch sensor and the substrate(s) that they are disposed on, where appropriate. Alternatively, where appropriate, reference to a touch sensor encompasses the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example, an electrode may be made of fine lines of metal or other conductive material (such as for example carbon nanotubes, copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example, the mechanical stack may include a first layer of optically clear adhesive (OCA) beneath a cover panel. The cover panel may be clear and made of a resilient material suitable for repeated touching, such as for example glass, polycarbonate (PC), or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Figure 2:
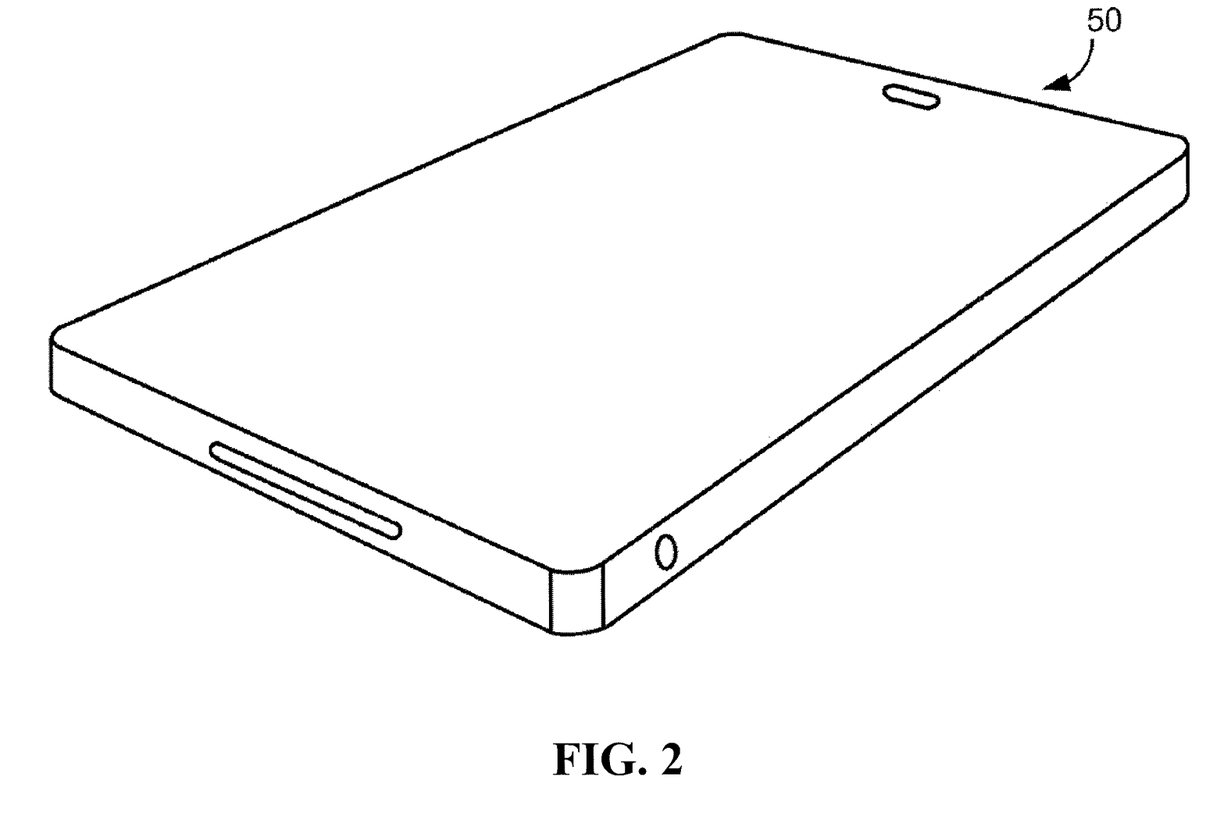
FIG. 2 illustrates an example device incorporating a touch sensor on a mechanical stack in accordance with an embodiment.

FIG. 2 illustrates an example device incorporating a touch sensor disposed on a mechanical stack. Examples of device 50 include a smartphone, a PDA, a tablet computer, a laptop computer, a desktop computer, a kiosk computer, a satellite navigation device, a portable media player, a portable game console, a point-of-sale device, another suitable device, a suitable combination of two or more of these, or a suitable portion of one or more of these. In the example of FIG. 2, device 50 includes a touch sensor implemented using a mechanical stack and a display underneath the touch sensor. The one or more substrates of the mechanical stack includes or have attached to it tracking areas, which includes tracks providing drive and sense connections to and from the drive and sense electrodes of the touch sensor. As described above, an electrode pattern of touch sensor made from a conductive mesh using carbon nanotubes, gold, aluminum, copper, silver, or other suitable conductive material. A user of device 50 may interact with device 50 through the touch sensor implemented on a mechanical stack described above. As an example, the user interacts with the device by touching the touch-sensitive area of the touch sensor.

As will be described in more detail using the embodiments illustrated in FIGS. 3A and 3B, portions of the mechanical stack are formed on or within a display and/or a display stack of device 50. Furthermore, a portion of controller 12 is disposed in the mechanical stack. In this manner, the size of device 50 is reduced. The portion of controller 12 disposed in the mechanical stack is configured to determine whether a touch was detected and another portion of controller 12 disposed external to the mechanical stack, such as for example on a printed circuit board, further processes the detected touch to determine how device 50 should respond to the touch.

A challenge introduced by disposing a portion of controller 12 in the mechanical stack in certain embodiments is that the signals communicated between the portion of controller 12 disposed in the mechanical stack and the portion of controller 12 disposed external to the mechanical stack are distorted and/or attenuated by the high pass filter inherent in the communication interface. This challenge is more pronounced when the portion disposed in the mechanical stack and portion external to the mechanical stack have different ground potentials. One way to address this challenge is to use octocouplers, but octocouplers are expensive and thus introduce undesired component and/or manufacturing costs. Another way to address this challenge is to maintain a signaling rate that is greater than the frequency cutoff of the high pass filter and to DC balance the transmitted signal. However, maintaining a high signaling rate results in several undesirable side effects. First, maintaining a high signaling rate leads to high power consumption. Second, the circuitry that maintains the high signaling rate uses a large amount of silicon area on both the transmitter and receiver side. Third, several thousand clock cycles are used to synchronize the transmitter and receiver, which increases startup time.

This disclosure contemplates using an interface that allows for low or moderate speed communication between the portion of controller 12 in the mechanical stack and the portion external to the mechanical stack. The interface includes a transmitter portion and a receiver portion. The transmitter portion includes a driver and the receiver portion includes a current sensor. The transmitter portion couples to the receiver portion through one or more capacitors. The interface translates voltage signals to current signals. The portion of controller 12 external to the mechanical stack processes the current signals to determine whether touches were detected even if the signaling rate of the transmitter portion is low. In this manner, certain embodiments avoid the use of components (e.g., octocouplers) that increase manufacturing costs. Furthermore, some embodiments experience reduced power consumption (especially idle power consumption). Moreover, in some embodiments, startup times are reduced and DC balancing is unnecessary. Features of touch sensor 10 and/or device 50 will be discussed in more detail below.

One or more portions of the substrate of touch sensor 10 is made of PET or another suitable material. This disclosure contemplates any suitable substrate with any suitable portions made of any suitable material. In particular embodiments, the drive or sense electrodes in touch sensor 10 are made of ITO in whole or in part. In particular embodiments, the drive or sense electrodes in touch sensor 10 are made of fine lines of metal or other conductive material. As an example, one or more portions of the conductive material is copper or copper-based and have a thickness within a range between approximately 1 and approximately 5 microns (μm) and a width within a range between approximately 1 and approximately 10 μm. As another example, one or more portions of the conductive material is silver or silver-based and similarly have a thickness of approximately 1 and approximately 5 μm and a width of approximately 1 and approximately 10 μm. This disclosure contemplates any suitable electrodes made of any suitable material.

Touch sensor 10 may implement a capacitive form of touch sensing. In a mutual-capacitance implementation, touch sensor 10 includes an array of drive and sense electrodes forming an array of capacitive nodes. A drive electrode and a sense electrode form a capacitive node. The drive and sense electrodes forming the capacitive node come near each other, but not make electrical contact with each other. Instead, the drive and sense electrodes may be capacitively coupled to each other across a space between them. A pulsed or alternating voltage applied to the drive electrode (by touch-sensor controller 12) induces a charge on the sense electrode, and the amount of charge induced is susceptible to external influence (such as a touch or the proximity of an object). When an object touches or comes within proximity of the capacitive node, a change in capacitance occurs at the capacitive node and touch-sensor controller 12 measures the change in capacitance. By measuring changes in capacitance throughout the array, touch-sensor controller 12 determines the position of the touch or proximity within the touch-sensitive area(s) of touch sensor 10.

In a self-capacitance implementation, touch sensor 10 includes an array of electrodes of a single type that each form a capacitive node. When an object touches or comes within proximity of the capacitive node, a change in self-capacitance occurs at the capacitive node and touch-sensor controller 12 measures the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 determines the position of the touch or proximity within the touch-sensitive area(s) of touch sensor 10. This disclosure contemplates any suitable form of capacitive touch sensing, where appropriate.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them form a capacitive node. For a self-capacitance implementation, electrodes of only a single type are disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. In particular embodiments, the drive and sense electrodes define the touch-sensitive area of touch sensor 10. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 detects and processes the change in capacitance to determine the presence and location of the touch or proximity input. Touch-sensor controller 12 then communicates information about the touch or proximity input to one or more other components (such one or more central processing units (CPUs) or digital signal processors (DSPs)) of a device that includes touch sensor 10 and touch-sensor controller 12, which responds to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 includes a processor unit, a drive unit, a sense unit, and a storage unit. The drive unit supplies drive signals to the drive electrodes of touch sensor 10. The sense unit senses charge at the capacitive nodes of touch sensor 10 and provide measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit stores programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 couples the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 provide drive connections for coupling touch-sensor controller 12 to drive electrodes of touch sensor 10, through which the drive unit of touch-sensor controller 12 supplies drive signals to the drive electrodes. Other tracks 14 provide sense connections for coupling touch-sensor controller 12 to sense electrodes of touch sensor 10, through which the sense unit of touch-sensor controller 12 senses charge at the capacitive nodes of touch sensor 10. Tracks 14 may be made of fine lines of metal or other conductive material. As an example, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 are located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 are connected to an electro-mechanical connector (such as a zero insertion force wire-to-board connector); in this embodiment, connection 18 does not include an FPC. This disclosure contemplates any suitable connection 18 between touch-sensor controller 12 and touch sensor 10.

Figure 3A:
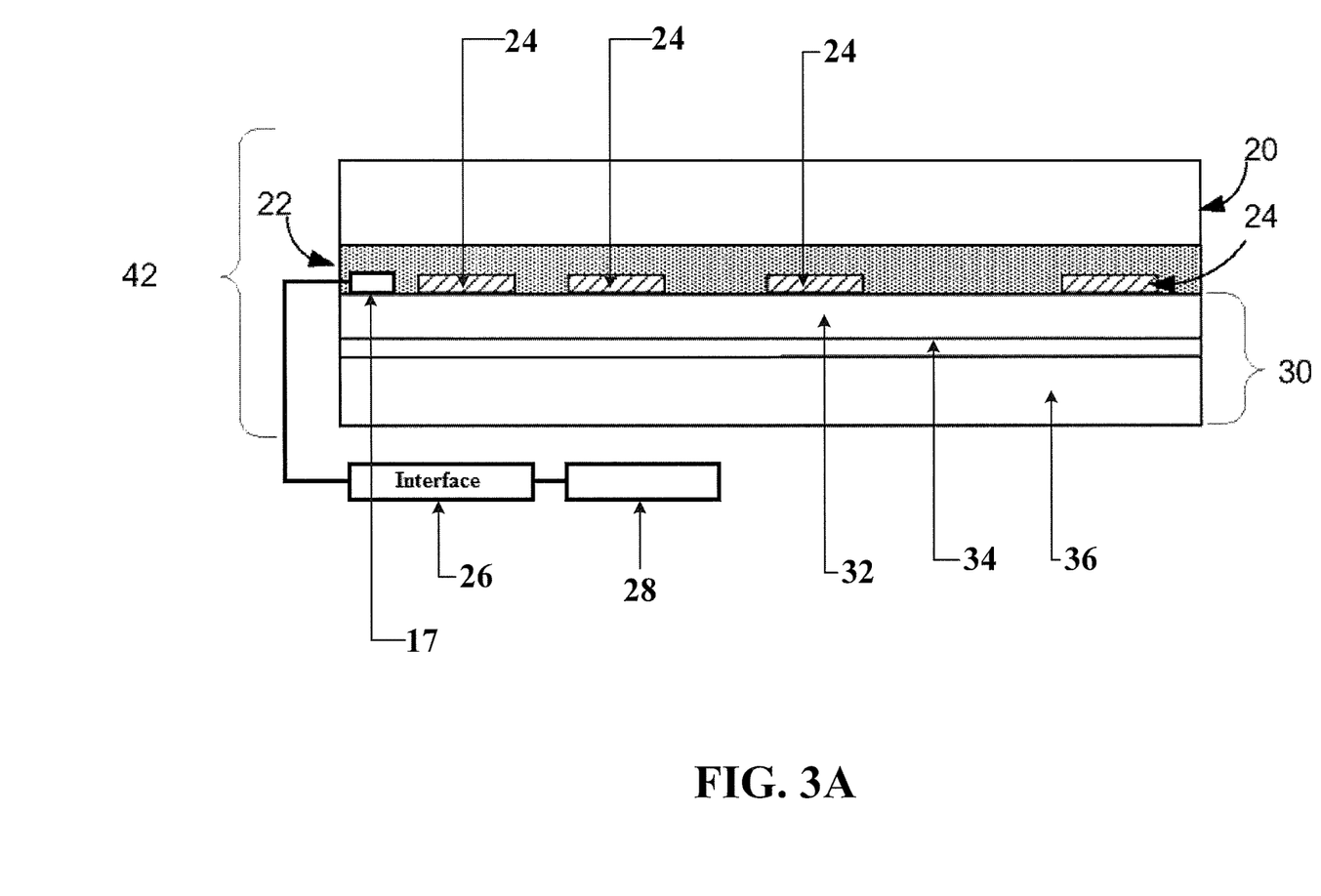
FIGS. 3A-B illustrate example cross-sections of an example mechanical stack in accordance with an embodiment.
Figure 3B:
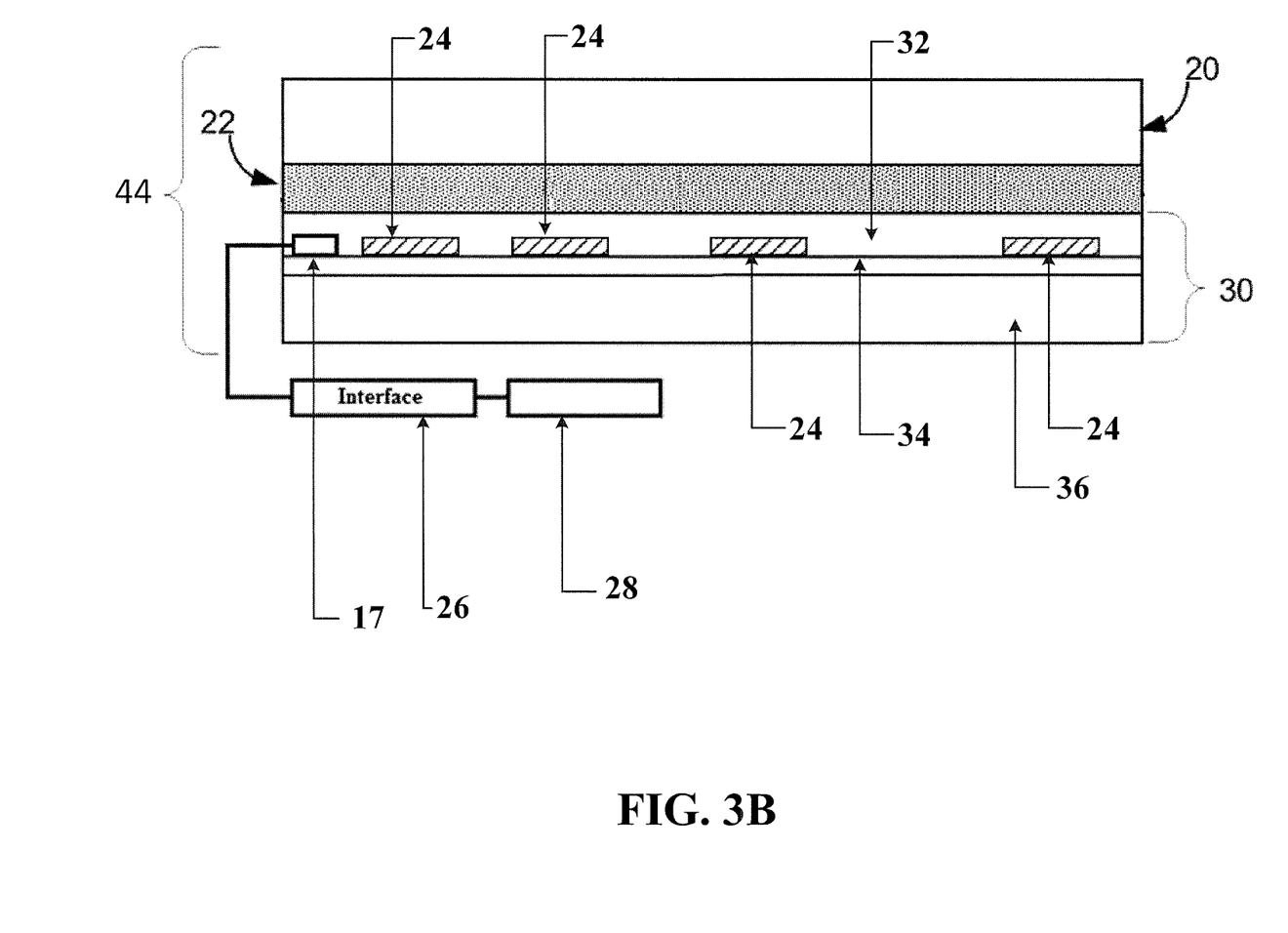

FIGS. 3A and 3B illustrate example cross-sections of example mechanical stacks 42 and 44. As described above, portions of mechanical stack 42 or 44 may be disposed on or within a display and/or display stack 30. Although this disclosure describes particular mechanical stack configurations with a particular number of particular layers made of particular materials and having particular thicknesses, this disclosure contemplates any suitable mechanical stack configuration with any suitable number of any suitable layers made of any suitable materials and having any suitable thicknesses. Mechanical stack 42 or 44 includes conductive material 24 forming the electrodes of the touch sensor. Cover panel 20 is made of substantially transparent material, such as for example glass, PC, or PMMA, and this disclosure contemplates any suitable cover panel made of any suitable material. In particular embodiments, mechanical stack 42 or 44 includes an adhesive layer 22 that couples cover panel 20 to display stack 30. As an example, adhesive layer 22 is an OCA or LOCA layer disposed between cover panel 20 and display stack 30. In particular embodiments, display stack 30 having its own structure and with one or more layers 32, 34, and 36 implements a display of a device that includes mechanical stack 42 or 44.

Conductive material 24 forming the electrodes may be an area of conductive material 24 that forms a shape, such as for example a disc, square, rectangle, other suitable shape, or suitable combination of these. As an example, conductive material 24 of an electrode is made from a conductive mesh of fine lines of conductive material 24 (such as for example carbon nanotubes, gold, aluminum, copper, silver, or copper- or silver-based material) or other conductive material and the fine lines of conductive material 24 occupies a range of approximately 1 to approximately 10% of the area of its shape in a hatched or other suitable pattern. As another example, the conductive mesh substantially covers an entire touch-sensitive area of the touch sensor. In particular embodiments, conductive material 24 is opaque. Although the fine lines of conductive material 24 are opaque, the combined optical transmissivity of electrodes formed using a conductive mesh is approximately 90% or higher, ignoring a reduction in transmittance due to other factors such as the substantially flexible substrate material. Thus, the contribution of the fine lines of conductive material 24 to the attenuation of light through the conductive mesh may be within a range of approximately 1 to approximately 10%. In other particular embodiments, the electrodes, tracking, and bond pads of the touch sensor are all formed from conductive material 24. This disclosure contemplates lines of conductive material that follow any variation of line direction or path from a straight line, including, but not limited to, wavy lines or zig-zag lines.

Display stack 30 includes one or more layers 32, 34, and 36 associated with displaying an image to a user. As an example, display stack 30 includes a layer 36 with elements that apply signals to a pixel layer 34 of a display and a cover layer 32. This disclosure contemplates the display being any display capable of presenting an image to a user, such as for example an LCD, OLED, etc.

In the example of FIG. 3A, conductive material 24 is disposed on the cover layer 32 of display stack 30, such that the display functions as the substrate for conductive material 24. In the example of FIG. 3B, conductive material 24 is disposed within display stack 30, such that a layer 34 of display stack 30, other than the cover layer 32, functions as a substrate, or substrate layer, for conductive material 24. In particular embodiments, display stack 30 includes one or more layers with an optical function that modifies an optical property of light originating underneath the substrate layer. Conductive material 24 is disposed on a layer of display stack 30 with an optical function that modifies an optical property of light originating underneath that substrate layer. As an example, display stack 30 includes a layer that polarizes light originating underneath that layer, i.e. a polarizer layer, and conductive material 24 is disposed on the polarizer layer. As another example, a layer of display stack 30 attenuates particular color components of light originating underneath that layer, i.e. a color filter layer, and conductive material 24 is disposed on the color filter layer. Conductive material 24 is situated between the remaining layers of the display stack, such as for example the cover layer 32 of the display stack, and the layer of the display stack on which conductive material 24 is disposed, such as for example the polarizer layer. This disclosure contemplates conductive material 24 being disposed on any layer of display stack 30.

As illustrated in FIGS. 3A and 3B, mechanical stack 42 or 44 includes a first portion 17 of a controller 12. The first portion 17 of controller 12 is disposed on the same layer of display stack 30 as conductive material 24. For example, the first portion 17 of controller 12 is disposed on the cover layer 32 of display stack 30 as illustrated in FIG. 3A. As another example, the first portion 17 of controller 12 is disposed within display stack 30 as illustrated in FIG. 3B. This disclosure further contemplates the first portion 17 of controller 12 being disposed on a different layer of display stack 30 than conductive material 24. For example, the first portion 17 of controller 12 is disposed within display stack 30 while conductive material 24 is disposed on the cover layer 32 of display stack 30, and vice versa.

The first portion 17 of controller 12 is coupled to conductive material 24. The first portion 17 of controller 12 is configured to detect changes in capacitance in particular regions of conductive material 24 caused by touches or proximity inputs. As a result, the first portion 17 of controller 12 is configured to detect a touch on touch sensor 10. In certain embodiments, first portion 17 of controller 12 is implemented on the same die(s) as the source drivers of display stack 30. In other embodiments, first portion 17 of controller 12 is implemented on separate die(s) as the source driver of display stack 30.

The first portion 17 of controller 12 communicates the detection of a touch to a second portion 28 of controller 12. The second portion 28 of controller 12 is disposed on a printed circuit board or other component external to display stack 30 and/or mechanical stack 42 or 44. Second portion 28 of controller 12 is configured to control the operation of a device incorporating touch sensor 10. For example, second portion 28 of controller 12 causes the device to produce a sound or vibration in response to the detection of a touch. As another example, second portion 28 of controller 12 causes the device to execute an application or function in response to the detection of a touch. This disclosure contemplates second portion 28 of controller 12 causing the device to perform any appropriate action. In certain embodiments, second portion 28 of controller 12 is located on the main PCB of the device (e.g., tablet, phone, computer, etc.), and can be a dedicated chip or integrated with other functions (e.g., video processing).

The coupling between first portion 17 and second portion 28 may act as a high pass filter for signals communicated between first portion 17 of controller 12 and second portion 28 of controller 12. This high pass filter distorts and/or attenuates low or moderate speed signals communicated between first portion 17 of controller 12 and second portion 28 of controller 12. An interface 26 may be used to address the distortion and/or attenuation caused by the high pass filter. By using interface 26, communication between first portion 17 and second portion 28 may be conducted successfully even though communication speeds and/or signaling rates are reduced below 100 megabits per second. In certain embodiments, by using interface 26, communication speeds and/or signaling rates are reduced further to between 10 megabits per second and 20 megabits per second. Interface 26 couples first portion 17 of controller 12 to second portion 28 of controller 12. For example, interface 26 is coupled to first portion 17 of controller 12 and second portion 28 of controller 12 and facilitates low or moderate speed communication between first portion 17 and second portion 28. Interface 26 is described in greater detail below using FIGS. 4A and 4B.

Figure 4A:
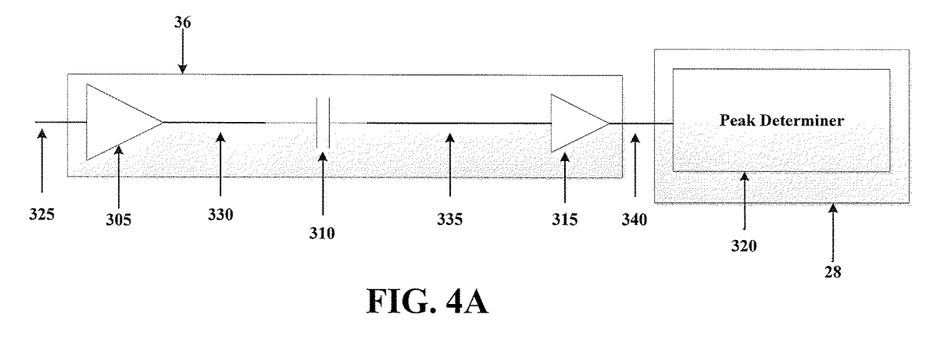
FIGS. 4A-B illustrate an example interface in accordance with an embodiment.
Figure 4B:
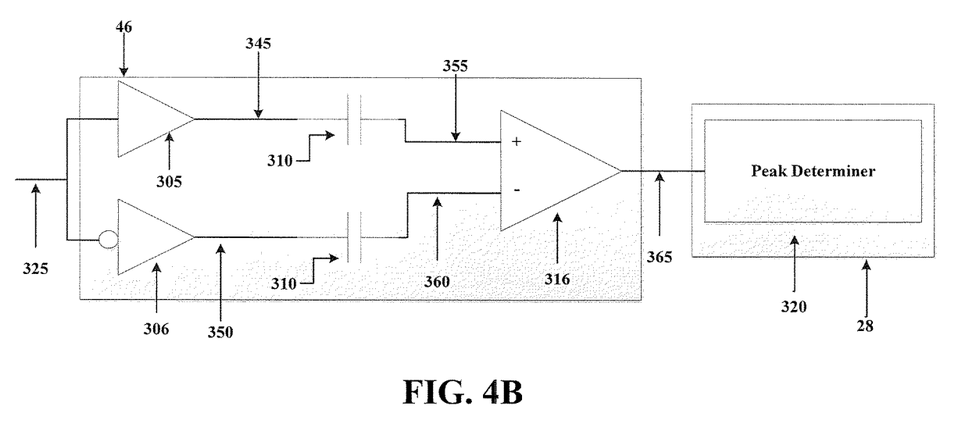

FIGS. 4A and 4B illustrate interfaces 36 and 46, which are examples of interface 26. As illustrated in FIG. 4A, interface 36 (e.g., a single-ended configuration) includes a driver 305, a capacitor 310, and a current sensor 315. A transmitter side of interface 36 includes driver 305. A receiver side of interface 36 includes current sensor 315.

Driver 305 is coupled to an output 325 of first portion 17 of controller 12. In particular embodiments, driver 305 may be a general purpose input/output driver. An output 330 of driver 305 is coupled to capacitor 310. An output 335 of capacitor 310 is coupled to current sensor 315, which may be a low impedance device. An output 340 of current sensor 315 is coupled to second portion 28 of controller 12. Signals from first portion 17 of controller 12 travel to driver 305, then to capacitor 310, then to current sensor 315, and then to second portion 28 of controller 12.

Interface 36 translates a voltage signal into a current signal based on the formula $I=C(dV/dt)$. For example, when first portion 17 of controller 12 determines that a touch occurred on touch sensor 10, first portion 17 of controller 12 outputs to interface 36 a voltage signal indicating the touch occurred. Interface 36 converts that voltage signal to a current signal. Based on the above formula, interface 36 produces a nonzero current signal when the voltage signal changes in amplitude and/or magnitude (i.e. when dV/dt is nonzero). An example voltage signal and current signal response is discussed using FIG. 5.

Second portion 28 of controller 12 includes a peak determiner 320 coupled to the output 340 of current sensor 315. Peak determiner 320 is configured to detect when a magnitude of an electric current is greater than or equal to a configured threshold. For example, peak determiner 320 determines when the current output of current sensor 315 exceeds a threshold level or falls below a threshold level. Based on that determination, peak determiner 320 determines when the voltage signal of first portion 17 of controller 12 rises and falls. It may be possible then to determine the voltage signal of first portion 17 of controller 12 using the current detected by current sensor 315. For example, if the magnitude of the current and the capacitance of capacitor 310 are known, then the magnitude of the voltage signal is the integral over time of the ratio of the current to the capacitance (plus a DC offset). When the current signal exceeds a particular threshold, second portion 28 of controller 12 determines that the voltage signal of first portion 17 of controller 12 is rising. When the current signal falls below a particular threshold, second portion 28 of controller 12 determines that the current signal of first portion 17 of controller 12 is falling. The thresholds may be configured to any appropriate value to account for noise that triggers a voltage response in the output of first portion 17 of controller 12 or a current response in the output 340 of interface 36.

FIG. 4B illustrates interface 46 (e.g., differential AC-coupled configuration), another example of interface 26, with differential inputs. Interface 46 may be used when the ground potentials of first portion 17 of controller 12 and second portion 28 of controller 12 are not constant relative to each other. As illustrated in FIG. 4B, interface 46 includes a driver 305, and inverted driver 306, capacitors 310, and a differential current sensor 316. The transmitter side of interface 46 includes driver 305 and inverted driver 306. The receiver side of interface 46 includes differential current sensor 316. Driver 305 and inverted driver 306 are coupled to output 325 of first portion 17 of controller 12. Each capacitor 310 is coupled to output 345 of driver 305 or output 350 of inverted driver 306. The outputs 355 and 360 of capacitors 310 are coupled to the inputs of differential current sensor 316. As discussed above, peak determiner 320 determines when the current signal output of differential current sensor 316 exceeds or falls below a threshold value. As with interface 36, based on the current signal, the voltage signal from first portion 17 of controller 12 may be determined based on formula $I=C(dV/dt)$.

Although this disclosure illustrates and describes interface 36 and interface 46 including particular components, it is understood that these illustrations and descriptions are examples. Interface 36 and interface 46 may include additional or fewer components than illustrated and described without departing from the scope of the invention. Furthermore, although this disclosure describes interface 36 and interface 46 implemented in the context of a touch sensor display, this disclosure contemplates interface 36 and interface 46 being used in any context where A/C coupling is used. For example, interface 36 and interface 46 may be implemented in medical applications where equipment connected to patients are galvanically isolated. In such applications, interface 36 and interface 46 may allow for communication across the isolated domains.

Figure 5:
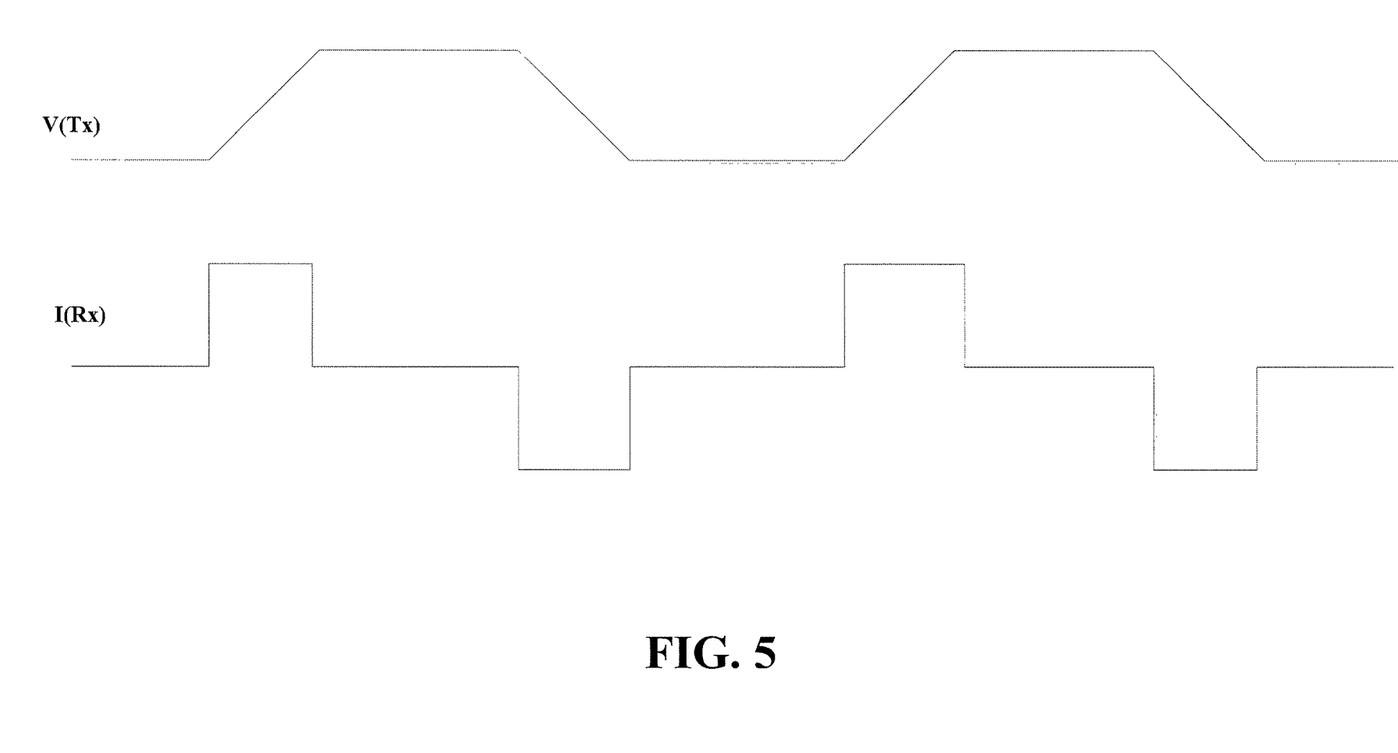
FIG. 5 illustrates an example signal response of an example interface in accordance with an embodiment.

FIG. 5 illustrates an example signal response of an example interface. As illustrated in FIG. 5, the voltage signal output (V(Tx)) of first portion 17 of controller 12 rises and falls based on the detection of touches on touch sensor 10. The current signal output (I(Rx)) of interface 26 will rise and fall when V(Tx) transitions from one voltage to another. As a result, second portion 28 of controller 12 is able to communicate with first portion 17 of controller 12 by relying on edge detection rather than continuously monitoring voltage levels. Consequently, the communication speed (or signaling rate) between first portion 17 of controller 12 and second portion 28 of controller 12 may be reduced.

In particular embodiments, interface 26 also removes a need to DC balance because second portion 28 of controller 12 relies on edge detection rather than voltage detection (which could be affected by drift that is remedied by DC balancing). In certain embodiments, interface 26 lowers power usage compared to other interfaces because only leakage current is consumed in drivers 305 and 306, except during signal transitions. In some embodiments, because interface 26 lowers the signaling rate between first portion 17 of controller 12 and second portion 28 of controller 12, interface 26 reduces the amount of time needed to synchronize first portion 17 of controller 12 and second portion 28 of controller 12 compared to other interfaces. As a result, it takes less time to start up touch sensor 10.

Figure 6:
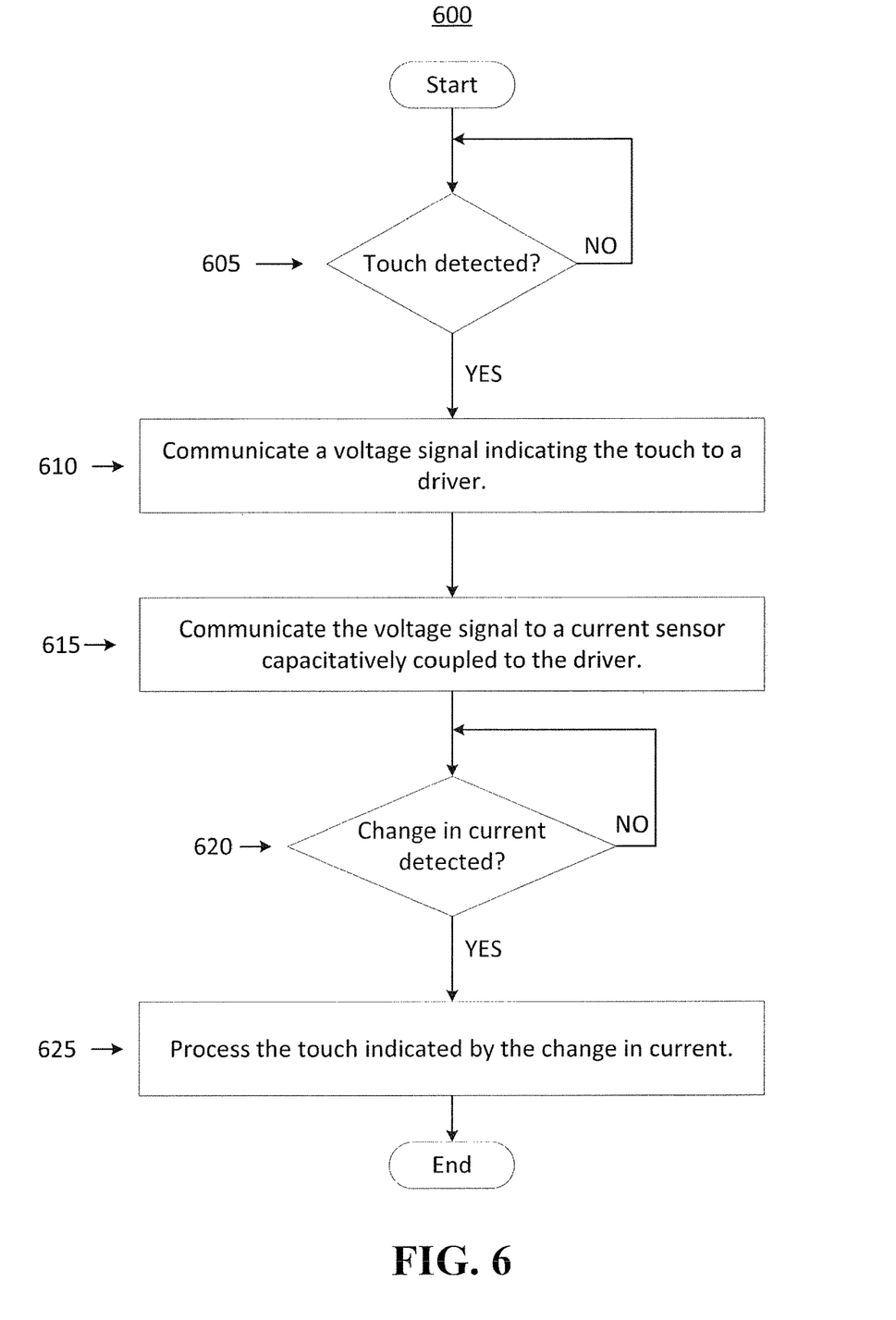
FIG. 6 is a flowchart illustrating an example method of operating a touch sensor in accordance with an embodiment.

FIG. 6 is a flowchart illustrating an example method 600 of operating touch sensor 10. In particular embodiments, controller 12 and/or interface 26 perform method 600. Controller 12 begins by determining whether a touch was detected in step 605. In certain embodiments, first portion 17 of controller 12 determines whether a touch was detected. Controller 12 continues to detect for touches until a touch is detected. When a touch is detected, controller 12 continues to step 610 to communicate a voltage signal indicating the touch to a driver. The driver is included in a transmitter side of interface 26. Then, in step 615, interface 26 communicates the voltage signal to a current sensor coupled to the driver through a capacitor. The current sensor is included in a receiver side interface 26. In step 620, controller 12 determines whether a change in current occurred. In particular embodiments, second portion 28 of controller 12 makes this determination. When a change in the current is detected, controller 12 processes the touch indicated by the change in current in step 625.

Modifications, additions, or omissions may be made to method 600 depicted in FIG. 6. Method 600 may include more, fewer, or other steps. For example, steps may be performed in parallel or in any suitable order. While discussed as controller 12 and/or interface 26 performing the steps, any suitable component, such as touch sensor 10 for example, may perform one or more steps of the method.

Herein, reference to a computer-readable storage medium may include a semiconductor-based or other IC (such, as for example, a field-programmable gate array (FPGA) or an ASIC), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a display stack comprising one or more layers;
   a touch sensor disposed, at least in part, on a layer from among the one or more layers; and
   a touch sensor controller having first and second portions and an interface,
   wherein the first portion is disposed on a layer from among the one or more layers of the display stack, the second portion is disposed external to the display stack, and the interface is coupled between the first and second portions,
   wherein the interface includes a driver, a capacitor and a current sensor configured in series between an input and output of the interface to convert a voltage signal at the input to a current signal at the output, and
   wherein the first portion is coupled to the driver and configured to process a signal indicative of a touch input from the touch sensor for input as a voltage signal to the driver, and the second portion is coupled to the current sensor and configured to process a current signal output from the current sensor to the output of the interface.

2. The apparatus of claim 1, wherein the current sensor comprises a differential current sensor, and the interface further comprises an inverted driver coupled to the first portion of the touch sensor controller and to a second capacitor, and wherein the differential current sensor is also coupled to the second capacitor.

3. The apparatus of claim 1, wherein the second portion of the touch sensor controller comprises a peak determiner configured to detect that a magnitude of an electric current is greater than or equal to a threshold.

4. The apparatus of claim 1, wherein the touch sensor and the first portion of the touch sensor controller are disposed, at least in part, on the same layer of the one or more layers.

5. The apparatus of claim 1, wherein the first portion of the touch sensor controller is configured to communicate a voltage signal to the driver, the voltage signal indicating a detection of a touch by the touch sensor.

6. The apparatus of claim 5, wherein the second portion of the touch sensor controller is configured to detect a change in a current signal outputted by the current sensor.

7. The apparatus of claim 1, wherein the touch sensor and the first portion of the touch sensor controller are disposed, at least in part, beneath an adhesive layer of the one or more layers.

8. The apparatus of claim 1, wherein the first portion of the touch sensor controller is disposed on a layer within one or more layers of the display stack.

9. An interface for converting a voltage signal at an input to a current signal at an output, comprising:

a driver coupled to a first portion of a touch sensor controller, the first portion of the touch sensor controller disposed on a layer from among one or more layers of a display stack and coupled to a touch sensor, the touch sensor disposed, at least in part, on one or more of the layers of the display stack;

a capacitor coupled to the driver; and a current sensor coupled between the capacitor and a second portion of the touch sensor controller, the second portion disposed external to the display stack and configured to process a signal output from the current sensor representative of a touch on the touch sensor.

10. The interface of claim 9, wherein the current sensor comprises a differential current sensor, and further comprising an inverted driver coupled to the first portion of the touch sensor controller and to a second capacitor, wherein the differential current sensor is also coupled to the second capacitor.

11. The interface of claim 9, wherein the second portion of the touch sensor controller comprises a peak determiner configured to detect that a magnitude of an electric current is greater than or equal to a threshold.

12. The interface of claim 9, wherein the first portion of the touch sensor controller and the touch sensor are disposed, at least in part, on the same layer of the one or more layers.

13. The interface of claim 9, wherein the touch sensor and the first portion of the touch sensor controller are disposed, at least in part, beneath an adhesive layer of the one or more layers.

14. The interface of claim 9, wherein the first portion of the touch sensor controller is disposed on a layer within one or more layers of the display stack.

15. A method comprising:

detecting a touch by a touch sensor, the touch sensor disposed, at least in part, on one or more of layers of a display stack;

determining that the touch is detected by using a first portion of a touch sensor controller disposed on a layer from among one or more layers of the display stack, the first portion of the touch sensor controller configured to process a signal from the touch sensor, the first portion of the touch sensor controller coupled to the touch sensor;

in response to determining the touch was detected, communicating, by the first portion of a touch sensor controller, a voltage signal indicating the touch to a driver, the driver coupled to the first portion of the touch sensor controller and in series to a capacitor;

communicating the voltage signal to a current sensor coupled in series to the capacitor;

detecting, by a second portion of the touch sensor controller disposed external to the display stack and coupled to the current sensor, a change in a current signal outputted by the current sensor indicative of the touch; and processing, by the second portion of the touch sensor controller, the touch indicated by the change in the current signal.

16. The method of claim 15, wherein the voltage signal is further communicated to an inverted driver coupled to the first portion of the touch sensor controller and to a second capacitor.

17. The method of claim 15, wherein the second portion of the touch sensor controller comprises a peak determiner configured to detect that a magnitude of an electric current is greater than or equal to a threshold.

18. The method of claim 15, wherein the touch sensor and the first portion of the touch sensor controller are disposed, at least in part, on the same layer from the one or more layers.

19. The method of claim 15, wherein the first portion of the touch sensor controller is disposed on a layer within one or more layers of the display stack.

20. The method of claim 15, wherein the touch sensor and the first portion of the touch sensor controller are disposed, at least in part, beneath an adhesive layer of the one or more layers.

* * * * *